United States Patent [19]

Tanabe et al.

[11] Patent Number: 5,133,783
[45] Date of Patent: Jul. 28, 1992

[54] INNER PERIPHERAL TYPE THIN PLATE BLADE AND METHOD OF PRODUCING THE SAME

[75] Inventors: Keiichiro Tanabe; Naoji Fujimori, both of Itami, Japan

[73] Assignee: Sumitomo Electric Industries, Ltd., Osaka, Japan

[21] Appl. No.: 603,442

[22] Filed: Oct. 26, 1990

[30] Foreign Application Priority Data

Oct. 27, 1989 [JP] Japan .................. 1-281398
Oct. 19, 1990 [JP] Japan .................. 2-282417

[51] Int. Cl.⁵ .................. B24D 7/18; B24D 18/00
[52] U.S. Cl. .................. 51/295; 51/206 R;
  51/307; 125/13.02; 125/15
[58] Field of Search .................. 125/13.02, 15;
  51/206 R, 295, 293, 207, 307

[56] References Cited

U.S. PATENT DOCUMENTS 3,640,027 8/1972 Weiss .................. 51/206 R
3,765,132 10/1973 Mackey .................. 51/206 R
4,850,331 7/1989 Balck .................. 51/209 R

FOREIGN PATENT DOCUMENTS 2449156  6/1976 Fed. Rep. of Germany .
8806254  7/1988 Fed. Rep. of Germany .
3908153  9/1989 Fed. Rep. of Germany .
0094263  4/1987 Japan .................. 125/15
3267166 11/1988 Japan .................. 51/295
0159175  6/1989 Japan .................. 51/209 R
2172673  7/1990 Japan .................. 51/295
 526370  8/1972 Switzerland .

*Primary Examiner*—Robert A. Rose
*Attorney, Agent, or Firm*—Cushman, Darby & Cushman

[57] ABSTRACT

An annular thin plate blade having a cutting edge at its inner periphery and a method of producing the thin plate blade in which an annular member made of polycrystalline diamond formed by vapor phase synthesis is provided at the inner periphery of the thin plate blade and the thin plate blade has a thickness of 20 to 300 μm.

5 Claims, 5 Drawing Sheets

INNER PERIPHERAL TYPE THIN PLATE BLADE AND METHOD OF PRODUCING THE SAME

BACKGROUND OF THE INVENTION

The present invention generally relates to cutting of an ingot and particularly, to an inner peripheral type thin plate blade suitable for cutting a large-diameter ingot of single-crystal semiconductor and a method of producing the blade.

Conventionally, when ICs (integrated circuits) or LSIs (large scale integrated circuits) are produced by using semiconducting materials such as Si, Ge, GaAs, InP, etc., a cutting process of cutting a synthesized single-crystal ingot into wafers is quite vital in determination of production cost, quality and yield. In this known cutting process, a cylindrical ingot is cut into disklike wafers of 0.3 to 0.5 mm in thickness by using an inner peripheral type diamond whetstone, a multiwire, a multiband steel, etc. In view of slicing efficiency, cutting cost and cutting allowance, slicing by an inner peripheral type whetstone has come into commonest use. Generally, in the known inner peripheral type whetstone of FIGS. 1 and 2, a cutting edge 2 constituted by diamond abrasive grains 4 of about 50 μm in diameter and a nickel electrodeposition layer 5 is formed at an inner periphery of an annular metal base 1.

In the known inner peripheral type whetstone, since the diamond abrasive grains 4 subjected to nickel electrodeposition is employed, it is difficult to control thickness of the cutting edge 2 due to electrodeposition. Therefore, the known inner peripheral type whetstone has such drawbacks as wide distribution of thickness of the cutting edge 2, large cutting allowance, separation of the diamond abrasive grains 4 from the cutting edge 2 and wear of the nickel electrodeposition layer 5, thereby resulting in aggravation of its cutting accuracy and service life.

SUMMARY OF THE INVENTION

Accordingly, an essential object of the present invention is to provide an inner peripheral type thin plate blade for cutting an ingot, whose cutting accuracy, wear resistance and resistance to failure are excellent.

Another important object of the present invention is to provide a method of producing the inner peripheral type thin plate blade at low cost.

In order to accomplish these objects of the present invention, a thin plate blade of annular shape, according to the present invention has a cutting edge at its inner periphery, wherein an annular member made of polycrystalline diamond formed by vapor phase synthesis is provided at the inner periphery of said thin plate blade and said thin plate blade has a thickness of 20 to 300 μm.

BRIEF DESCRIPTION OF THE DRAWINGS

These objects and features of the present invention will become apparent from the following description taken in conjunction with the preferred embodiments thereof with reference to the accompanying drawings, in which:

FIG. 4 is an enlarged sectional view of a cutting edge portion of the cutting blade of FIG. 3a;

FIG. 6 is an enlarged sectional view of a cutting edge portion of the cutting blade of FIG. 5a;

Before the present invention proceeds, it is to be noted that like parts are designated by like reference numerals throughout several views of the accompanying drawings.

DETAILED DESCRIPTION OF THE INVENTION

Figure 3A:
FIGS. 3a and 3b are a side sectional view and a bottom plan view of an inner peripheral type cutting blade according to a first embodiment of the present invention, respectively.
Figure 3B:
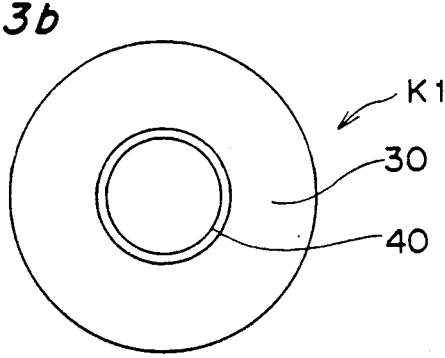
Figure 4:
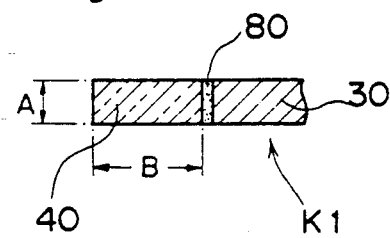

Referring now to the drawings, there is shown in FIGS. 3a, 3b and 4, an inner peripheral type cutting blade K1 suitable for cutting a large-diameter ingot of single-crystal semiconductor, according to a first embodiment of the present invention. The cutting blade K1 has a thickness of 20–300 μm and includes an annular metal base 30. An annular polycrystalline diamond film 40 formed by vapor phase synthesis is bonded to an inner periphery of the metal base 30 by a bonding layer 80.

Figure 5A:
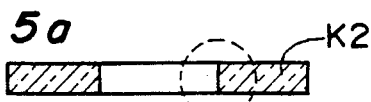
FIGS. 5a and 5b are a side sectional view and a bottom plan view of an inner peripheral type cutting blade according to a second embodiment of the present invention, respectively.
Figure 5B:
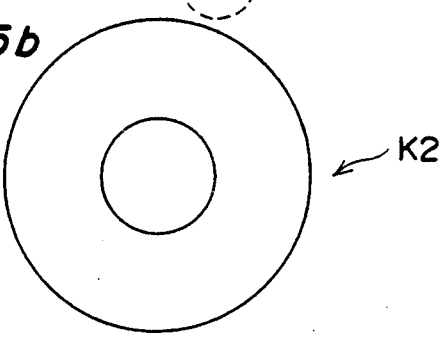
Figure 6:
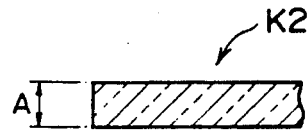

Meanwhile, FIGS. 5a, 5b and 6 show an inner peripheral type cutting blade K2 according to a second embodiment of the present invention. The cutting blade K2 has also a thickness of 20–300 μm and is wholly made of polycrystalline diamond formed by vapor phase synthesis.

Generally, in order to increase rigidity of an inner peripheral type diamond whetstone, the diamond whetstone is strained by applying a tensile stress to an outer periphery of a metal base of the diamond whetstone. However, the tensile stress at an inner periphery of the diamond whetstone becomes larger than that of the outer periphery of the diamond whetstone. Therefore, the diamond whetstone is likely to be distorted and thus, a work hardened surface layer of wafers is also increased. In order to reduce this distortion of the diamond whetstone, a cutting edge portion should be strained by a large force.

The cutting blades K1 and K2 of the present invention are partially and wholly made of polycrystalline diamond formed by vapor phase synthesis, respectively and therefore, have high tensile strengths. Accordingly, the cutting blades K1 and K2 can be strained by a large force, thereby resulting in improvement of cutting accuracy of wafers and enabling slicing of the wafers for a long period.

Namely, since the cutting blades K1 and K2 are partially and wholly made of diamond formed by vapor phase synthesis, the cutting blades K1 and K2 have the following features (1) to (7) in comparison with an earlier mentioned known cutting blade having a cutting edge formed by diamond grains and a nickel electrodeposition layer.

(1) Since the outer peripheral portion can be strained by a larger force, distortion of the inner peripheral portion is reduced, thereby resulting in improvement of cutting accuracy of wafers.

(2) Since binder (electrodeposition layer) is not employed, amount of wear of the cutting blade is reduced. Hence, it becomes possible to perform slicing operation for a long period. Therefore, the number of replacement of the cutting edge can be reduced, thus resulting in great reduction in cost of cutting operation.

(3) In the case where diamond is formed on a base member and one side face of the diamond adjacent to the base member is used as a cutting edge after removing the base member through its melting, the cutting edge is capable of having a surface roughness Rmax of about 0.05 $\mu$m. Therefore, a finished surface of a workpiece can be improved remarkably. As a result, the workpiece can be cut to finish state at a time without hitherto required multiple steps from rough cutting to finish cutting. In addition, cutting allowance can be reduced and cutting accuracy can be improved.

(4) Even a large-diameter inner peripheral type cutting blade can be produced at high accuracy.

(5) Since failure of the abrasive grains of the prior art cutting blade does not take place, the cutting blade has excellent wear resistance and durability.

(6) Since grain diameter of diamond can be controlled arbitrarily in accordance with vapor phase synthesis conditions, a diamond film of even about 20 to 30 $\mu$m in thickness can be obtained. Accordingly, it becomes possible to reduce cutting allowance and improve cutting accuracy.

(7) Grain diameter of diamond can be controlled only by vapor phase synthesis conditions such that an inner peripheral portion of the cutting edge is increased in thickness, while grain diameter of diamond is reduced further towards an outer peripheral portion of the cutting edge. Thus, quality and yield of the cutting blade can be improved.

The cutting blades K1 and K2 have a thickness of 20-300 $\mu$m as described earlier. This thickness is selected on the following ground. Namely, if thickness of the cutting blade is less than 20 $\mu$m, the metal base and diamond itself have insufficient strength and therefore, is readily subjected to failure. On the other hand, if thickness of the cutting blade exceeds 300 $\mu$m, cutting allowance is increased, thereby resulting in drop of yield.

Hereinbelow, a method of producing the cutting blade K1, according to the present invention is described with reference to FIGS. 10a(1) and 10b(1) to FIGS. 10a(3) and 10b(3). The method includes a first step of FIGS. 10a(1) and 10b(1) in which diamond is formed on a side face of a cylindrical base member 60, a second step of FIGS. 10a(2) and 10b(2) in which the base member 60 is removed through its melting by acid treatment or the like such that the annular diamond film 40 is obtained and a third step of FIGS. 10a(3) and 10b(3) in which the annular diamond film 40 is secured to the inner periphery of the annular metal base 30 by the bonding layer 80.

Figure 7:
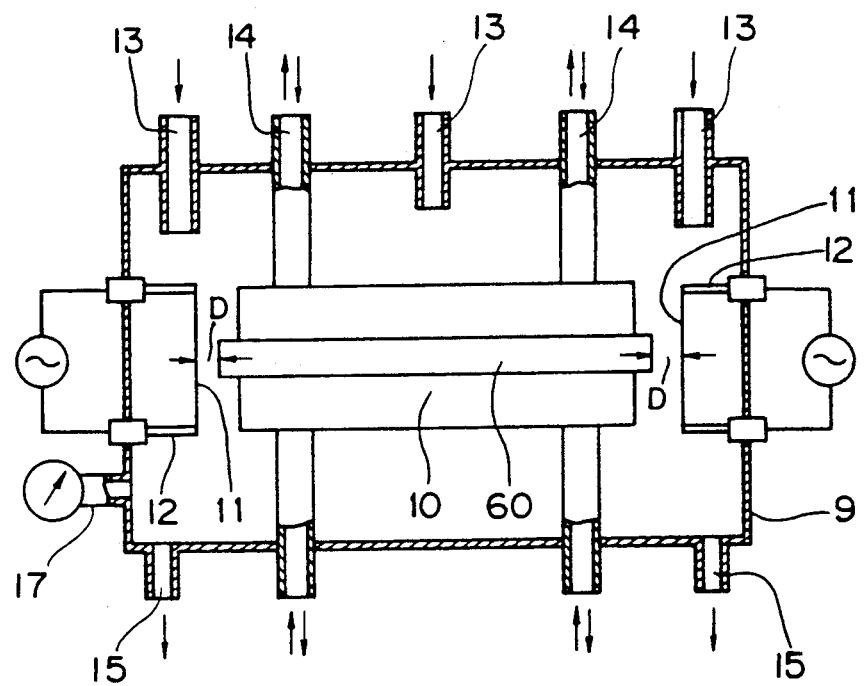
FIGS. 7, 8 and 9 are schematic views showing three examples of a filament CVD apparatus for coating diamond, which is applicable to production of the cutting blade of the present invention, respectively.

In the first step, diamond is coated on the side face of the cylindrical base member 60 by using a filament CVD (chemical vapor deposition) apparatus of FIG. 7 acting as a diamond synthesis apparatus. The filament CVD apparatus includes an apparatus housing 9, a stand 10 for supporting the base member 60, a pair of filaments 11 for activating gas, a pair of electrodes 12, three gas inlets 13, a pair of cooling water passages 14, a pair of gas outlets 15 and a pressure gauge 17.

It may also be so arranged that a cutting operation for adjusting thickness A of the diamond film 40 by laser beams is performed between the second and third steps.

Figure 11:
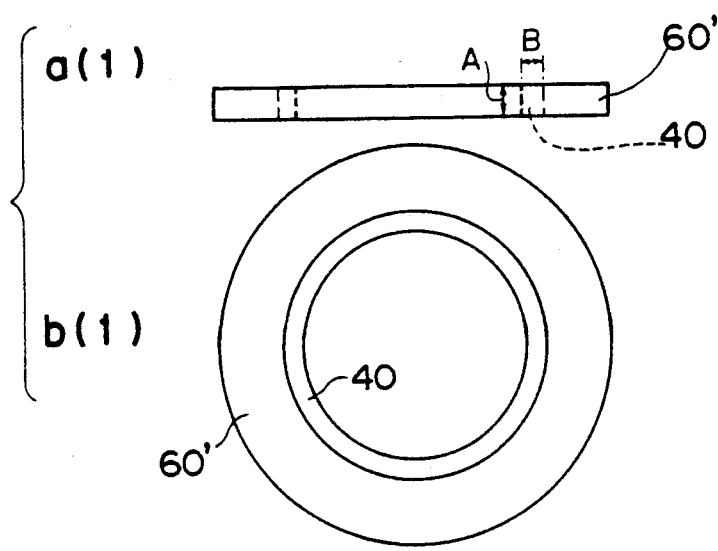
FIGS. 11a(1) and 11b(1) are views similar to FIGS. 10a(1) and 10b(1), respectively, particularly showing a modification thereof.

FIGS. 11a(1) and 11b(1) show a modified first step in which diamond is formed on an inner periphery of an annular base member 60'. In this first step, diamond is coated on the inner periphery of the annular base member 60' by using a filament CVD apparatus of FIG. 8 acting as a diamond synthesis apparatus.

The base members 60 and 60' may be made of ordinary materials for synthesizing diamond, for example, Mo, W, Si, Ta, Nb, Cu, Al, B, Be, Au, Pt, Fe, Ti, C, C having Si deposited thereon, SiC, AlN, SiN, WC, MoC, BN, BC, NbC, TaC or the like.

The metal base 30 is usually made of carbon tool steel, stainless steel, etc. The bonding layer 80 for securing the diamond film 40 to the metal base 30 may be formed by adhesive but is desirably formed by solder in view of its excellent heat resistance and durability.

Meanwhile, the annular diamond film 40 is produced by the above two procedures of FIGS. 10a(1) and 10b(1) and FIGS. 11a(1) and 11b(1). In the case of FIGS. 10a(1) and 10b(1), an inner side face of the diamond film 40 confronting the base member 60 at the time of deposition of diamond on the base member 60 is used as the cutting edge, while an outer side face of the diamond film 40 on which diamond is grown has a rough surface and is attached to the metal base 30. Thus, by improving surface roughness of the inner side face of the diamond film 40, it becomes possible to improve surface roughness of the cutting edge of diamond, so that roughness of a cut surface of a workpiece can be improved and thus, the cutting blade K1 can also be used for finishing.

On the other hand, in the case of FIGS. 11a(1) and 11b(1), the cutting edge portion and the bonding portion are disposed opposite to those of FIGS. 10a(1) and 10b(1). Thus, an inner side face of the diamond film 40 on which diamond film is grown has a rough surface and is used as the cutting edge. Therefore, roughness of the cut surface of the workpiece is slightly deteriorated and thus, the cutting blade K1 is suitable for rough cutting.

The cutting blade K2 wholly made of diamond formed by vapor phase synthesis is produced in the same manner as the method of FIGS. 10a(1) and 10b(1) to FIGS. 10a(3) and 10b(3) and the method of FIGS. 11a(1) and 11b(1). The cutting blade K2 is produced by using, for example, a filament CVD apparatus of FIG. 9.

Figure 8:
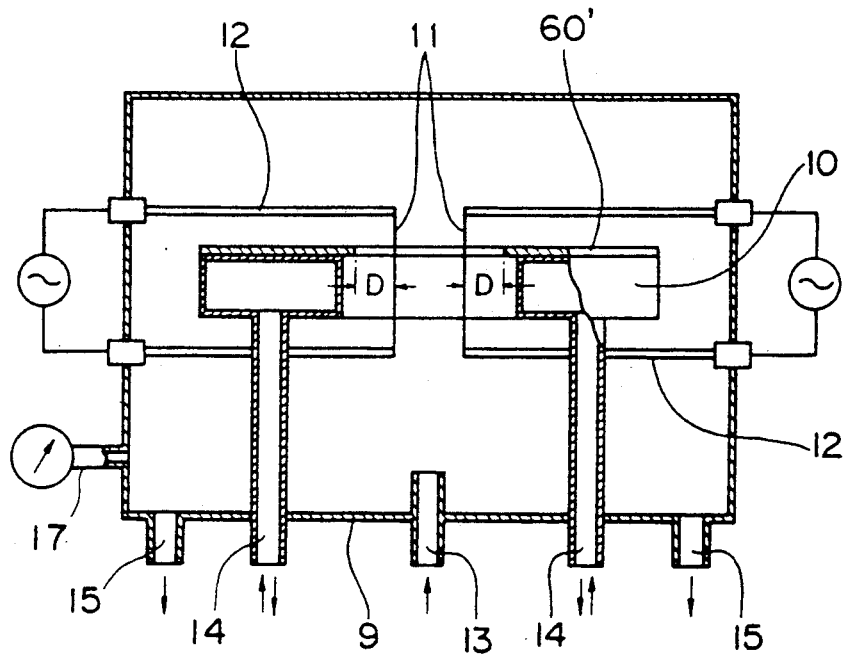
Figure 9:
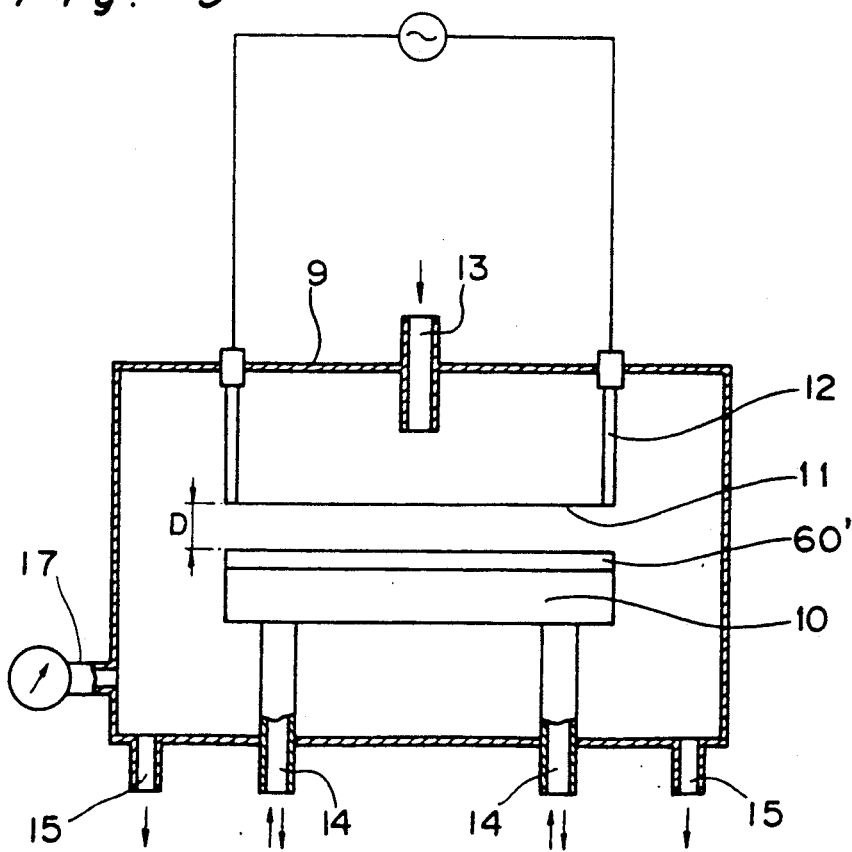

The filament CVD apparatuses shown in FIGS. 7 to 9 are operated under vacuum and include the several filaments 11 to several tens of the filaments 11. The stand 10 for supporting the base member 60 or 60' may be provided rotatably. In FIGS. 7 to 9, character D denotes a distance between the filament 11 and the base member 60 or 60'.

Hereinbelow, examples 1 and 2 of production of the cutting blade of the present invention are described.

EXAMPLE 1

The cutting blade K1 was produced by using the filament CVD apparatus of FIG. 7 and employing as the base member 60, a cylinder shown in Table 1 below and having an outside diameter of 1840 mm. In Table 1, C/Si represents material in which 5000 Å Si has been deposited on a carbon member by sputtering.

Figure 10:
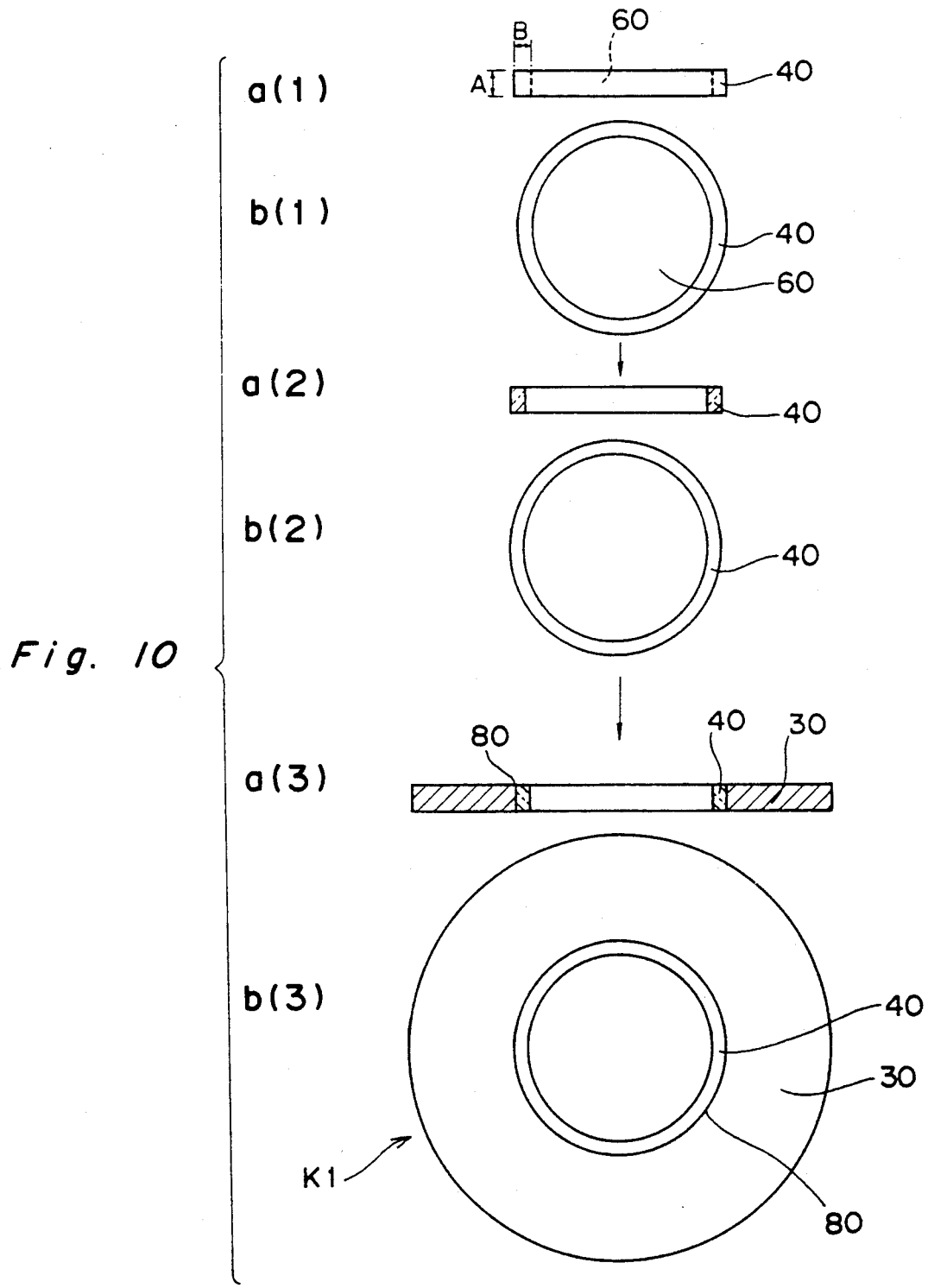
FIGS. 10a(1) and 10b(1), FIGS. 10a(2) and 10b(2) and FIGS. 10a(3) and 10b(3) are views showing first, second and third steps of a method of producing the cutting blade of FIG. 4, according to the present invention, respectively.

Under synthesis conditions shown in Table 1, diamond was deposited on the side face of the cylindrical base member 60 as shown in FIG. 10.

TABLE 1

| Sample No. | Supply gas (SCCM) | Pressure (Torr) | D (mm) | Base member Material | Thickness (mm) |
|---|---|---|---|---|---|
| 1 | $H_2$-1000 $CH_4$-20 | 80 | 7 | Si | 80 |
| 2 | $H_2$-500 $CH_4$-15 | 40 | 8 | Si | 25 |
| 3 | $H_2$-200 $CH_4$-6 | 50 | 10 | C/Si | 200 |
| 4 | $H_2$-600 $CH_4$-12 $O_2$-2 | 120 | 5 | W | 50 |
| 5 | $H_2$-1000 $C_2H_5OH$-20 | 100 | 6 | Mo | 80 |

TABLE 2

| Sample No. | Thickness of portion A ($\mu$m) | Thickness of portion B ($\mu$m) |
|---|---|---|
| 1 | 80 | 200 |
| 2 | 25 | 120 |
| 3 | 200 | 280 |
| 4 | 50 | 400 |
| 5 | 80 | 80 |
| Comparative example | 3000 | 4200 |

Then, the diamond film 40 obtained by the first and second steps of FIGS. 10a(1) and 10b(1) and FIGS. 10b(1) and 10b(2) have dimensions shown in Table 2 above.

Figure 1A:
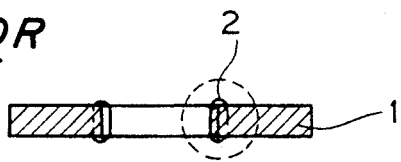
FIGS. 1a and 1b are a side sectional view and a cutting blade, respectively (already referred to)
Figure 1B:
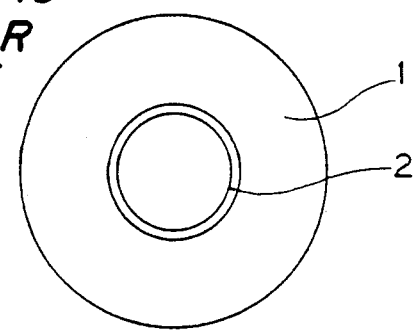
Figure 2:
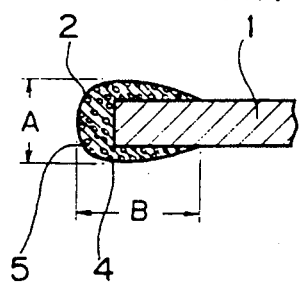
FIG. 2 is an enlarged sectional view of a cutting edge portion of the prior art cutting blade of FIG. 1a (already referred to)

In Table 2, the prior art cutting blade of FIG. 2 is recited as a comparative example.

By using the thus obtained cutting blade K1, an ingot of single-crystal silicon and of 1800 mm in diameter was cut by slicing conditions of peripheral speed of the cutting blade of 1000 m/min. and feed rate of 40 mm/min. Results of this cutting is shown in Table 3 below. Meanwhile, in Table 3, the prior cutting blade of FIG. 2 is recited as a comparative example.

TABLE 3

| Sample | No. of slicing | Accuracy of wafer Parallelism ($\mu$m) | Distortion ($\mu$m) | Scatter of thickness ($\mu$m) |
|---|---|---|---|---|
| 1 | 4000 | 4 ± 0.5 | 3.0 ± 0.7 | 3.0 ± 0.8 |
| 2 | 4300 | 7 ± 1.0 | 4.0 ± 0.9 | 4.2 ± 0.9 |
| 3 | 1800 | 8 ± 2.0 | 8.5 ± 1.2 | 6.0 ± 1.3 |
| 4 | 3000 | 5 ± 1.1 | 4.0 ± 1.2 | 3.0 ± 0.4 |
| 5 | 2600 | 8 ± 1.2 | 10.0 ± 2.2 | 3.1 ± 0.8 |
| Comparative example | 1000 | 25 ± 5 | 20.0 ± 3.5 | 18.0 ± 3.0 |

Table 3 reveals that the cutting blade K1 in which the diamond film 40 is formed at the cutting edge improves cutting accuracy remarkably and lengthens service life greatly.

EXAMPLE 2

The cutting blade K2 was produced by using the filament CVD apparatus of FIG. 9. The annular base member 60' is made of polycrystalline silicon and has an inside diameter of 1840 mm, an outside diameter of 4930 mm and a thickness of 0.1 mm. It was found from the same cutting operation as Example 1 performed by using the obtained cutting blade K2 that 2000 wafers can be sliced.

As is clear from the foregoing, in the thin plate blade for cutting the single-crystal ingot, according to the present invention, the diamond film formed by vapor phase synthesis is provided at the cutting edge. Hence, in the thin plate blade of the present invention, binder such as Ni or Co and the electrodeposition layer are not employed, so that partial wear or failure of the cutting blade does not take place and thus, cutting operation can be performed at high accuracy for a long period. Accordingly, the number of replacement of the cutting edge is reduced and yield of the cutting blade is improved, thereby resulting in great reduction of cost of cutting operation.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A thin plate blade of annular shape, which has a cutting edge at its inner periphery,
   wherein an annular member made of a polycrystalline diamond formed by vapor phase synthesis is provided at the inner periphery of said thin plate blade, and said thin plate blade has a thickness of 20 to 300 $\mu$m, and wherein the annular member is attached to the inner periphery of the thin plate blade by soldering.

2. A thin plate blade of annular shape, which has a cutting edge at its inner periphery and is made of polycrystalline diamond formed by vapor phase synthesis and has a thickness of 20 to 300 $\mu$m.

3. A method of producing an annular thin plate blade having a cutting edge at its inner periphery, comprising the steps of:
   forming a diamond film on a base member by vapor phase synthesis;
   melting the base member so as to remove the base member from the diamond film; and
   mounting the diamond film on an inner periphery of an annular metal base.

4. A method as claimed in claim 3, wherein the diamond film is mounted on the inner periphery of the metal base by soldering.

5. A thin plate blade of annular shape for cutting a single crystal ingot, which has a cutting edge at its inner periphery,
   wherein an annular member made of a polycrystalline diamond formed by vapor phase synthesis is provided at the inner periphery of said thin plate blade, and said thin plate blade has a thickness of 20 to 300 $\mu$m, and wherein the annular member is attached to the inner periphery of the thin plate blade by soldering.

* * * * *